Oct. 28, 1924.                                                    1,513,558
H. C. PARKER
METHOD OF AND APPARATUS FOR DETERMINING ION CONCENTRATION
Filed May 16, 1924
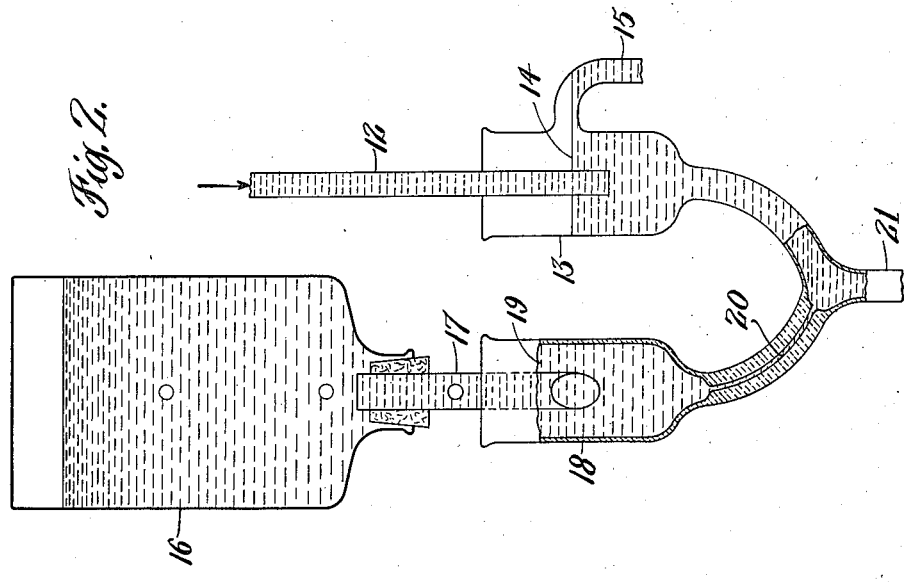
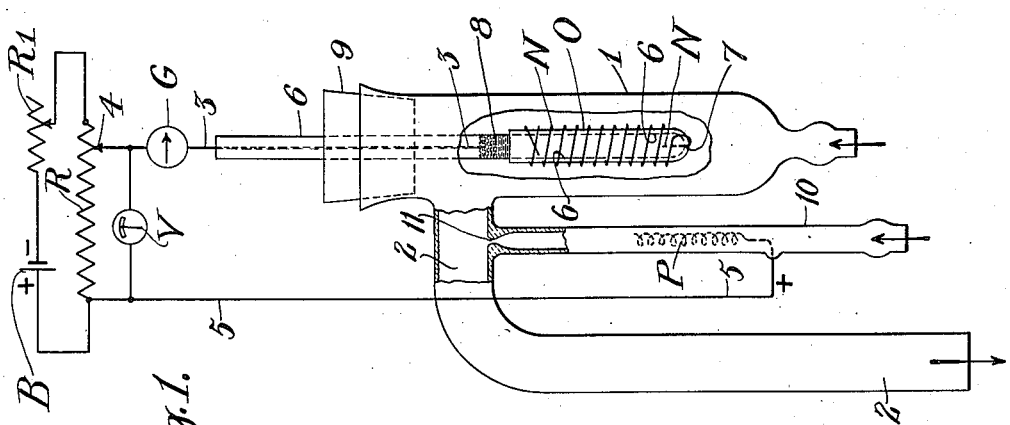
INVENTOR
Henry C. Parker
BY Cornelius D. Ehret
His ATTORNEY Patented Oct. 28, 1924.

1,513,558

UNITED STATES PATENT OFFICE.

HENRY C. PARKER, OF PHILADELPHIA, PENNSYLVANIA, ASSIGNOR TO LEEDS & NORTHRUP COMPANY, OF PHILADELPHIA, PENNSYLVANIA, A CORPORATION OF PENNSYLVANIA.

METHOD OF AND APPARATUS FOR DETERMINING ION CONCENTRATION.

Application filed May 16, 1924. Serial No. 713,683.

*To all whom it may concern:*

Be it known that I, HENRY C. PARKER, residing in the city and county of Philadelphia, State of Pennsylvania, have invented certain new and useful Improvements in Methods of and Apparatus for Determining Ion Concentration, of which the following is a specification.

My invention relates to the measurement or determination of the concentrations of selected ions, as hydrogen or hydroxyl ions, in solutions or electrolytes, and in general to the utilization for any purpose of the electro-motive-force dependent upon or representative of ion concentrations.

In accordance with my invention, there is utilized and provided an oxygen electrode, suitable particularly for alkaline and weak acid solutions, including such as contain oxidizing substances in solution, having such characteristics that when employed with a suitable constant half cell, the equation expressing the relation between the electromotive force of the cell and the logarithm of the reciprocal of the ion concentration is a linear function, that is, the curve yielded by plotting electro-motive-forces of the cell against the logarithm of the reciprocals of the ion concentration is a straight line.

In accordance with my invention, such an oxygen electrode comprises an electrode of suitable metal or other material, disposed adjacent or in intimate contact with a solid which yields oxygen ions in sufficient quantity or at suitable rate and which is insoluble or at most slightly soluble in the solution involved.

In accordance with my invention, the oxygen electrode may comprise an electrode of metal or other suitable material immersed in the solution to which there has been added a solution of oxidizing material or material yielding oxygen ions, to effect a constant and definite concentration of oxidant in the solution.

Further in accordance with my invention, there is provided a constant half cell comprising an electrode of suitable metal immersed in a solution of a suitable compound or salt of the metal of preferably constant concentration.

My invention resides in the method, apparatus and combinations of materials of the character hereinafter described and claimed.

For an understanding of my method and for an illustration of some of the various forms my apparatus may take, reference is to be had to the accompanying drawings, in which:

Fig. 1 is a side elevational view, partly in vertical section, of apparatus embodying my invention, in association with a diagrammatic view of a circuit in which it is utilizable.

Fig. 2 is a side elevational view, partly in vertical section, of apparatus utilizable for introducing into the electrolyte solution at suitable rate or in suitable quantity a solution of an oxidant.

Heretofore, in the art of measuring, determining or utilizing ion concentration, as of hydrogen or hydroxyl, there has been commonly employed a hydrogen electrode which has the characteristic that the relation between the electro-motive-force of the cell and the logarithm of the reciprocal of the ion concentration is a linear function. However, there are some relations in which a hydrogen electrode is unsuitable, as for example, when the solution contains oxidizing substances or substances yielding oxygen ions.

Furthermore, an oxygen electrode, such as platinized platinum supplied with oxygen gas, is irregular or erratic in behavior in that there exists a considerable difference between the theoretically and experimentally determined values of the potential of the cell provided with such an electrode, and also because the potential drifts and approaches or attains no definite value or magnitude as a limit.

It is also known that various metallic electrodes immersed in a solution which is or has been in contact with the air give a rough measurement of hydrogen ion concentration due, presumably, to a small but variable or indefinite amount of oxygen dissolved in the solution, and thereby causing them to function in a sense as oxygen electrodes. Such metallic electrodes, so employed, yield inaccurate results. When the metallic electrode is polarized by passing a small current through it for a suitable time, as a fraction of a minute, the magnitude of the potential thereafter produced by the electrode differs considerably from the true equilibrium potential of the electrode. This is shown by polarizing the electrode by passing a current of the same magnitude through it in opposite direction, after which the potential obtained will be considerably different from that first mentioned. The difference between these two potentials may be termed a "dead space," and within this range or dead space the electrode is found to be substantially entirely insensitive to changes in hydrogen ion concentration. In investigating electrodes of many different metals, including tungsten, it is found that this dead space varies between .005 and .090 volt for the different metals. For tungsten the dead space or range is of the order of .005 volt, which limits its accuracy and hence its field of applicability. The relation of the potential of the tungsten electrode to the logarithm of the hydrogen ion concentration is a curve and not a linear function, which also shows that tungsten does not function properly as an oxygen electrode.

In accordance with my invention, the disadvantages of the hydrogen and oxygen electrodes of the types above referred to are overcome, and there is effected an oxygen electrode which does not exhibit the aforesaid dead space, but is sensitive throughout the entire range of changes in hydrogen ion concentration, at least for alkaline and weak acid solutions.

Referring to Fig. 1, the electrolyte or solution, the hydrogen or other ion concentration of which is involved, as for measurement or determination, is delivered into the lower end of the vessel or tube 1, of glass or other suitable material, and passes therefrom through the tube 2. Immersed in the electrolyte in the chamber 1 is the negative or oxygen electrode N connected through the conductor 3 and galvanometer G with the contact 4 slidable along the resistance R comprised in a potentiometer with the adjustable resistance $R^1$ and the battery or other source of uni-directional current B. The positive electrode P is connected through conductor 5 with the resistance R, and connected between the contact 4 and conductor 5 is the voltmeter V.

As well understood in the art, the current from the source B flowing through the resitance R is adjusted to suitable or predetermined magnitude by adjusting the resistance $R^1$. The cell, comprising the electrodes P and N, produces an electro-motive-force dependent upon the magnitude of the hydrogen or hydroxyl ion concentration in the electrolyte passed through the chamber 1, and this electro-motive-force is determined by moving the contact 4 to such position along the resistance R that the deflection of the galvanometer G is nil, whereupon the electro-motive-force of the cell is readable upon the voltmeter V.

The electrode N is preferably of tungsten, though it may be of platinum, gold, palladium, or other suitable metal or conducting material, preferably neutral to the solution in which immersed, and having suitably high conductivity or low specific resistance. The electrode may be in the form of wire as indicated, or in any other suitable form.

The electrode material N is disposed suitably adjacent to or in intimate contact with the body O of such character or composition as to yield oxygen or oxygen ions in sufficient quantity or at sufficient rate to produce the effects herein described, including the avoidance or elimination of the aforesaid dead space. The oxygen or oxygen ions yielded by the material O saturates the solution adjacent or in the neighborhood of the electrode N with oxidant whose concentration in the solution is constant and definite.

The material O is a solid, slightly, if at all, soluble in the electrolyte solution involved, and consisting of or to suitable degree comprising material yielding at desired rate or in sufficient quantity oxygen or oxygen ions which effect or intimately contact with the electrode N.

In the example illustrated, the body O is formed of granular or finely subdivided oxygen-yielding material mixed with collodion or other suitable binder and rolled or otherwise applied in a layer upon the exterior of the tube or member 6, of glass or other suitable material, and there is then wound upon the coating O the electrode wire N, which is sealed through the lower end of the tube 6 at 7 and is either connected directly to the conductor 3 or contacts within the tube 6 with a body of mercury 8 with which the conductor 3 connects. The tube 6 extends through a rubber or other stopper 9 and supports the electrode structure in the solution.

For the oxidant O there may be used various oxides or a mixture of oxides. For example, there may be used manganese dioxide, cobaltic oxide, lead dioxide, and equivalents.

In general, the highest or higher oxides of suitable metals are preferred, for it has been found that the metal oxides containing the largest proportion of oxygen effected to greatest extent the elimination of the aforesaid dead space.

Various mixtures of the higher and lower oxides of a metal, preferably other than the metal of which electrode N is composed, may also be employed and effect excellent results. For example, there may be employed manganese dioxide in mixture with sesquioxide of manganese; cobaltic in mixture with cobaltous oxide; lead dioxide in mixture with either or both litharge and red oxide of lead; or a mixture of litharge and red oxide of lead. Or with the oxide of one metal may be mixed an oxide of a different metal or a mixture of higher and lower oxides of a different metal or a mixture of oxides of different metals.

For the oxidizing body O there may be utilized a suitable natural mineral, such, for example, as pyrolusite, which alone is unsuitable because of variation in effects obtained therewith, probably due to its high specific resistance and non-uniformity of different samples. But when there is employed on or closely adjacent to pyrolusite a tungsten or other metallic electrode N, the combination serves to attain the uniform and desired results and effects herein described.

There is combined in the same structure with the electrolyte container and the negative electrode a constant half cell. In the example indicated, the half cell comprises the glass tube 10, within which is disposed the positive electrode P of suitable metal in any suitable form, such as a grid, wire, or the like, with which the conductor 5 connects.

The electrode P may be of copper, in which case there will be passed through the tube 10 through its lower end a solution of copper sulphate of preferably constant concentration. Or there may be used for the electrode P any other suitable metal with which there will be used an appropriate electrolyte comprising a solution of constant concentration of a suitable salt of the metal. For example, the electrode P may be of nickel, in which case the electrolyte associated therewith may be nickel sulphate, nickel chloride, or equivalent, of constant concentration. In any case, a constant difference of potential is maintained between the electrode P and its co-acting solution, which flows gradually upward through the tube and through the restricted orifice or passage 11 into the electrolyte flowing from the vessel 1 through the tube 2 and discharged from the latter. The potential at the liquid junction at 11 is small and constant, with the result that change in electromotive-force occurs only at the electrode N in accord with change of hydrogen or hydroxyl ion concentration.

In some cases the solution or electrolyte containing the ions whose concentration is to be measured or determined or otherwise utilized contains reducing agents or substances in such quantity or of such power, such, for example, as nitrites, that the amount of oxygen supplied by the body O is insufficient. In such cases it is desirable to supply oxygen in such quantity that the nitrites or other reducing substance or substances shall be oxidized and yet leave sufficient oxygen to supply ample oxygen ions to the negative electrode N to maintain and produce the effects and results herein described, including the elimination of the aforesaid dead space.

For this purpose there may be introduced into the solution or electrolyte under investigation a soluble or dissolved oxidizing agent, therefore effecting mixture with the solution under investigation, and in this mixture is immersed the negative electrode N of tungsten or other suitable material in the form of a wire, gauze or plate, with or without the co-action of a body O.

It has been found that the potential of such an electrode varies to some extent with the number of oxygen ions in or with the oxidation potential of the solution. It is essential, therefore, that this concentration be kept constant in order that the electrode give true measure of hydrogen or hydroxyl ion concentration. For this purpose there may be employed an arrangement of the character indicated in Fig. 2, where the solution or electrolyte whose ion concentration is involved is introduced through the tube 12 into the receptacle 13 in which its level 14 is maintained constant by the overflow 15. In a bottle or equivalent receptacle 16 there is stored a solution of oxidant or oxidizing agent, for example hydrogen peroxide, of suitable or predetermined concentration. The tube 17 extends into the receptacle 18 in which the solution of oxidant is maintained at a substantially constant level 19, below which the outlet of the tube 17 extends. Air bubbles can enter the vessel 16 only when the solution has fallen below the outlet opening of the tube 17, and accordingly a partial vacuum is maintained in the bottle 16 which prevents the liquid from rising above the constant level 19. The solution of oxidant flows through the restricted passage or capillary tube 20, which permits a few drops per minute to be delivered into the solution or electrolyte passing from the chamber 13 through the outlet 21, which may be connected to the inlet at the lower end of the vessel 1 of Fig. 1. Accordingly there is delivered to the structure of Fig. 1 a mixture of the solution or electrolyte under investigation with a solution of oxidant present in substantially constant amount or concentration, since the solution in the vessel 16 is of predetermined or suitable concentration and is delivered at substantially constant rate, due to the constant difference in levels 14 and 19, into the solution under investigation.

The predetermined and constant concentration of the oxidant so present in the solution under investigation ensures sufficient oxygen to oxidize the reducing substances, such as nitrites, present in the solution under investigation, such as boiler feed water, or any other like solution, leaving sufficient oxygen to effect co-operation with the electrode N of the character herein described, eliminating the dead space and accordingly effecting true results in accord with variations of hydrogen or hydroxyl ion concentration.

It is readily seen of course that the addition of a solution of oxidant in a definite and constant concentration as described above accomplishes the desired result (namely the bringing in contact with the electrode of a definite and constant concentration of oxidant) in a different manner from the method where a solid oxidant is employed. In the latter case the solution in the neighborhood of the electrode is kept saturated with the nearly insoluble oxidant and hence is kept at a constant concentration; while in the former case the concentration of oxidant is maintained by introducing it at suitable rate into the solution.

Reference in the appended claims to hydrogen ions will be understood, for brevity, to include hydrogen, hydroxyl, and such other ions to the utilization or determination of the concentration of which my invention is applicable.

What I claim is:

1. In the production of an electro-motive-force representative of the concentration of hydrogen ions in a solution, the method which comprises effecting in said solution in contact with an electrode a substantially constant and definite concentration of oxidant.

2. In the production of an electro-motive-force representative of the concentration of hydrogen ions in a solution, the method which comprises effecting in said solution in contact with an electrode a substantially constant and definite concentration of oxidant of such magnitude as to cause a linear relation between the logarithms of the reciprocals of the hydrogen ion concentrations and the potentials of said electrode representing said concentrations.

3. In the production of an electro-motive-force representative of the concentration of hydrogen ions in an alkaline or weak acid solution, the method which comprises effecting in said solution in contact with an electrode a substantially constant and definite concentration of oxidant of such magnitude as to cause a linear relation between the logarithms of the reciprocals of the hydrogen ion concentrations and the potentials of said electrode representing said concentrations.

4. In the production of an electro-motive-force representative of the concentration of hydrogen ions in a solution containing a reducing agent, the method which comprises introducing into the solution oxidant in quantity sufficient to effect after oxidation of the reducing agent a substantially constant and definite concentration of oxidant.

5. In the production of an electro-motive-force representative of the concentration of hydrogen ions in a solution containing a reducing agent, the method which comprises introducing into the solution oxidant in quantity sufficient to effect after oxidation of the reducing agent a substantially constant and definite concentration of oxidant of such magnitude as to cause a linear relation between the logarithms of the reciprocals of the hydrogen ion concentrations and the potentials representing said concentrations and effected by an electrode in said solution.

6. In the production of an electro-motive-force representative of the concentration of hydrogen ions in a solution, the method which comprises bringing the solution into contact with an electrode, effecting in the solution adjacent said electrode a substantially constant and definite concentration of oxygen ions, and producing said oxygen ions by a solid oxidant immersed in said solution.

7. A cell for utilizing or determining concentration of hydrogen ions in a solution comprising an electrode, and means for effecting a substantially constant and definite concentration of oxidant in said solution.

8. A cell for utilizing or determining concentration of hydrogen ions in a solution comprising an electrode, and means for delivering into the solution a dissolved oxidant to effect in said solution a substantially constant and definite concentration of oxidant.

9. The combination with a container, of means for passing therethrough a solution containing hydrogen ions, a vessel containing a solution of oxidant, and means for delivering said last named solution into said first named solution to effect in said first named solution a substantially constant and definite concentration of oxidant, and an electrode immersed in said solution in said container.

10. The combination with a container, of means for passing therethrough a solution containing hydrogen ions, a vessel containing a solution of oxidant, means for delivering said last named solution into said first named solution to effect in said first named solution a substantially constant and definite concentration of oxidant, and a tungsten electrode immersed in said solution in said container.

11. An oxygen electrode for a hydrogen ion cell comprising an electrode, and adjacent said electrode a solid yielding oxygen ions.

12. An oxygen electrode for a hydrogen ion cell comprising a mass of solid oxidant, and an electrode so positioned with respect thereto that the solution contacting with said electrode is substantially saturated with oxygen ions.

13. An oxygen electrode for a hydrogen ion cell comprising a mass of solid oxidant, and a metallic electrode in contact therewith.

14. An oxygen electrode for a hydrogen ion cell comprising a mass of solid oxidant, and a conductor wrapped upon said mass.

15. An oxygen electrode for a hydrogen ion cell comprising a mass of subdivided solid oxidant and a binder, and an electrode associated therewith.

16. An oxygen electrode for a hydrogen ion cell comprising a mass of subdivided solid oxidant and a binder, and an electrode in contact therewith.

17. An oxygen electrode for a hydrogen ion cell comprising a support, a coating of subdivided solid oxidant and binder on said support, and an electrode adjacent said coating.

18. An oxygen electrode for a hydrogen ion cell comprising a support, a coating of subdivided solid oxidant and binder on said support, and an electrode in contact with said coating.

19. An oxygen electrode for a hydrogen ion cell comprising a mass of pyrolusite, and an electrode in contact therewith.

20. An oxygen electrode for a hydrogen ion cell comprising a mass of pyrolusite, and a tungsten electrode in contact therewith.

21. An oxygen electrode for a hydrogen ion cell comprising a tungsten electrode, and adjacent said electrode a solid yielding oxygen ions.

22. An oxygen electrode for a hydrogen ion cell comprising a mass of solid oxidant, and a tungsten electrode so positioned with respect thereto that the solution contacting with said electrode is substantially saturated with oxygen ions.

23. An oxygen electrode for a hydrogen ion cell comprising a mass of subdivided solid oxidant and a binder, and a tungsten electrode in contact therewith.

24. An oxygen electrode for a hydrogen ion cell comprising an electrode, and adjacent said electrode a mixture of different metallic solid oxides.

25. An oxygen electrode for a hydrogen ion cell comprising a tungsten electrode and in contact therewith a mixture of different metallic solid oxides.

26. An oxygen electrode for a hydrogen ion cell comprising an electrode, and adjacent said electrode a mixture of different metallic solid oxides of a metal or metals different from said electrode.

27. An oxygen electrode for a hydrogen ion cell comprising a tungsten electrode and in contact therewith a mixture of different metallic solid oxides of a metal or metals other than tungsten.

28. A hydrogen ion cell comprising an electrode effecting potentials dependent upon concentrations of hydrogen ions, and a constant half cell comprising a metallic electrode, and a solution in which said metallic electrode is immersed having a definite concentration of ions of the metal of said electrode.

29. A hydrogen ion cell comprising an electrode effecting potentials dependent upon concentrations of hydrogen ions, and a constant half cell comprising a copper electrode, and a solution in which said copper electrode is immersed having a definite concentration of copper ions.

30. Apparatus for utilizing or determining hydrogen ion concentrations comprising a chamber, an electrode therein, means for passing a solution through said chamber, and a conduit through which solution is discharged from said chamber, and a half cell comprising a second chamber communicating with said conduit through a restricted outlet, an electrode in said second chamber, and means for delivering a liquid to said second chamber.

HENRY C. PARKER.